Jan. 7, 1936. C. A. COMPTON 2,026,867
OIL FILTER FOR RESTAURANTS
Filed Oct. 29, 1934

INVENTOR.
CHARLES A. COMPTON
BY Munn, Anderson & Liddy
ATTORNEYS.

Patented Jan. 7, 1936

2,026,867

UNITED STATES PATENT OFFICE 2,026,867

OIL FILTER FOR RESTAURANTS

Charles A. Compton, Menlo Park, Calif.

Application October 29, 1934, Serial No. 750,563

3 Claims. (Cl. 210—149)

My invention relates to improvements in oil filters for restaurants, and it consists of the combinations, constructions and arrangements hereinafter described and claimed.

An object of my invention is to provide an oil filter for restaurants which is an improvement over the form of the device shown in my Patent No. 1,927,228 issued September 19, 1933. In the patented device I showed an oil filter for a restaurant in which the wall of the filtering casing had a portion inclined for directing the oil toward the center of the filter. I further showed a cross arm at the top for holding the filtering material in place.

In the present invention I provide the filter casing with outwardly extending shoulders, each shoulder forming with its side wall, a compartment larger than the one therebeneath. Filtering material is placed in the compartments and the oil flowing upwardly from the casing bottom is prevented from passing around the outside of the filtering material because each compartment into which the oil passes is larger in diameter than the one directly below, and the side wall of each lower compartment directs the oil into the filtering material in the compartment disposed directly above. I further show the cross arm for holding in the filtering means as being provided with an extension that contacts with the under side of the oil receiving receptacle.

The oil filtering means comprises a plurality of screens placed one above the other, each screen resting on a casing shoulder. The filtering material is placed between the screens.

Other objects and advantages will appear in the following specification, and the novel features of the device will be particularly pointed out in the appended claims.

My invention is illustrated in the accompanying drawing forming a part of this application, in which Figure 1 is a front elevation of the oil filter;

Figure 2:
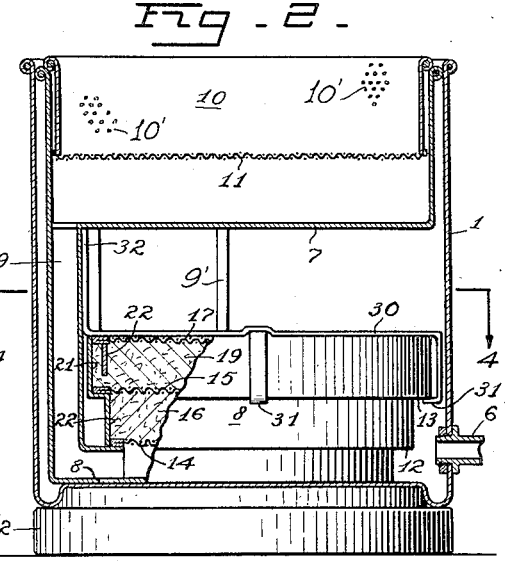
Figure 2 is a vertical section through a portion of the filter, a part of the filter wall being shown in elevation.
Figure 1:
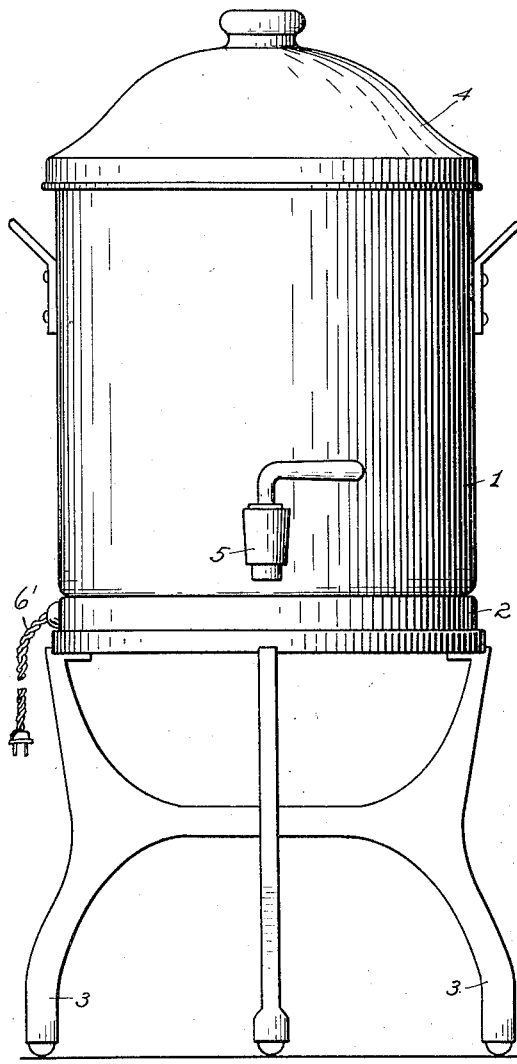

In carrying out my invention I show an oil filter which comprises a casing 1 disposed on a heating element 2, and the element in turn is supported by legs 3. An electric cord 6' is used for connecting the element 2 with a source of current. A cover 4 closes the casing 1, and an outlet valve 5 is disposed in an outlet pipe 6 that communicates with the interior of the casing 1.

Within the casing I dispose a temporary oil receptacle 7, and this receptacle is spaced above an oil filtering casing 8 and communicates with the interior of the casing by means of an oil passageway 9, see Figure 2. Auxiliary legs 9' cooperate with the oil passageway 9 for supporting the receptacle 7 above the casing 8. I place a strainer 10 within the receptacle 7, and this strainer has a screened bottom 11 through which the oil passes. The wall of the strainer 10 is perforated as shown at 10' in Figure 2. The oil flows by gravity from the receptacle 7 through the passage 9, and down into the bottom of the filtering casing 8.

Figure 3:
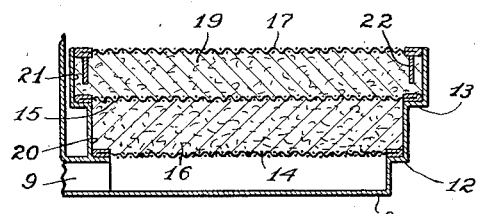
Figure 3 is a vertical section through the filtering means.
Figure 4:
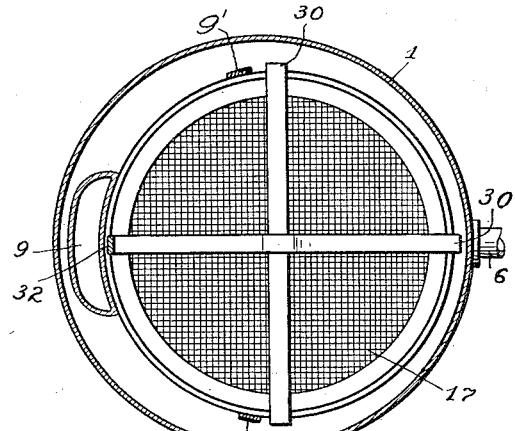
Figure 4 is a section along the line 4—4 of Figure 2.

The special construction of the filtering casing 8 is shown in Figure 3. The casing wall has two shoulders 12 and 13, and a screen 14 rests on the shoulder 12. A second screen 15 is mounted on the shoulder 13, and between the screens 14 and 15 I dispose a filtering material 16.

A top screen 17 similar to the screen 15, but larger in diameter is placed on filtering material 19, which in turn is supported by the screen 15. The screens 14, 15 and 17 form compartments 20 and 21 with the side wall of the casing 8 and these compartments are filled with the filtering material 16 and 19. Each screen is provided with a channel-shaped rim which is crimped to the screens.

The filtering material 19 is in the shape of a pad and the edge of the pad rests on the rim of the screen 15 which in turn rests on the shoulder 13. Before the screen 17 is placed on the pad 19 a ring 22 forces the edge of the pad against the rim of the screen 15 and against the casing wall 8. This ring prevents the oil from passing around the rim of the filter pad.

Figure 5:
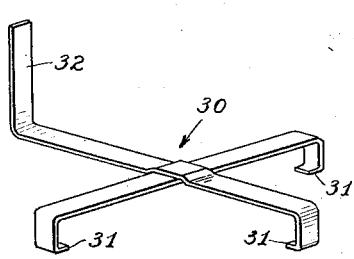
Figure 5 is a perspective view of the cross arm.

In Figure 5 I show a cross arm indicated generally at 30, and this cross arm has inwardly curved ends 31 for engaging with the shoulder 13. An upstanding portion 32 of the arm projects against the under surface of the receptacle 7, and in this way the cross arm is held in position. The arm in turn keeps the screen 17 in place.

From the foregoing description of the various parts of the device, the operation thereof may be readily understood.

The oil to be filtered is poured into the strainer 10 and from here the oil passes down into the filtering casing 8 by means of the passageway 9. The oil is heated by the heating element 2, and will rise in the casing 8 and fill the outer casing 1. The oil in rising will pass through the various filtering materials 16 and 19, and all of the oil will be caused to pass upwardly through the material due to the fact that each compartment is larger than the one disposed therebelow. The oil as it issues from the filtering casing 8 is therefore clean, and can be drawn out through the outlet 6 when the valve 5 is opened.

The parts may be readily cleaned because it will be noted that the filtering pads and the screens can be lifted from the casing 8 when the cross arm 30 is removed.

While I have shown only the preferred form of my invention it should be understood that various changes or modifications may be made within the scope of the appended claims without departing from the spirit of the invention.

I claim:

1. An oil filter comprising an outer casing, an inner casing for filtering the oil, a temporary oil receiving receptacle disposed at the top of the outer casing, a conduit leading from the receptacle and communicating with the bottom of the inner casing, filtering means disposed in the inner casing and being removable through the top of the inner casing, and means for holding the filtering means in place and bearing against the receptacle.

2. In combination with an oil retaining casing, an oil filtering casing disposed within the first casing, an oil receptacle connected to the oil filtering casing by a conduit and being spaced above the filtering casing, filtering means disposed in the filtering casing, and cross arms extending across the top of the filtering casing and having an extension bearing against the under surface of the receptacle for causing the cross arms to retain the filtering means in the filtering casing.

3. In combination with an oil retaining casing, an oil filtering casing disposed within the first casing, an oil receptacle connected to the oil filtering casing by a conduit and being spaced above the filtering casing, filtering means disposed in the filtering casing, and cross arms extending across the top of the filtering casing and having an extension bearing against the under surface of the receptacle for causing the cross arms to retain the filtering means in the filtering casing, the filtering means and the filtering casing being so designed that the filtering means can be removed through the top of the filtering casing when the cross arms are removed.

CHARLES A. COMPTON.